United States Patent [19]

Larsen

[11] Patent Number: 5,249,607
[45] Date of Patent: Oct. 5, 1993

[54] SYSTEM FOR TRANSFERRING ARTICLES

[75] Inventor: Hans K. Larsen, Aestorp, Sweden

[73] Assignee: Nestec S.A., Vevey, Switzerland

[21] Appl. No.: 794,738

[22] Filed: Nov. 18, 1991

[30] Foreign Application Priority Data

Dec. 17, 1990 [EP] European Pat. Off. ........ 90124437.6

[51] Int. Cl.⁵ ................................................ B65B 1/06
[52] U.S. Cl. ........................................ 141/1; 141/168;
141/171; 198/481.1; 198/418.6
[58] Field of Search ................... 141/1, 83, 153, 168,
141/170, 171, 176, 178, 179; 198/480.1, 481.1,
418.6

[56] References Cited

U.S. PATENT DOCUMENTS

| | | | |
|---|---|---|---|
| 2,499,266 | 2/1950 | Carroll | 198/481.1 |
| 3,199,551 | 8/1965 | Hall et al. | 141/83 |
| 3,225,513 | 12/1965 | Ehe | 198/418.6 X |
| 3,556,234 | 1/1971 | Moreno | 141/83 X |
| 3,557,889 | 1/1971 | Rejsa | 141/1 X |
| 3,614,924 | 10/1971 | Hickey | 198/481.1 X |
| 3,621,891 | 11/1971 | Eisenberg | 141/1 |
| 4,275,775 | 6/1981 | Egli | 141/83 |
| 4,387,747 | 6/1983 | Franek et al. | 141/1 |
| 4,567,923 | 2/1986 | Nalbach | 141/83 X |
| 4,877,067 | 10/1989 | Shimokawa et al. | 141/178 X |

FOREIGN PATENT DOCUMENTS 2910175  9/1979  Fed. Rep. of Germany ...... 141/171

Primary Examiner—Allan N. Shoap
Assistant Examiner—Christopher McDonald
Attorney, Agent, or Firm—Vogt & O'Donnell

[57] ABSTRACT

Emptying bowls are transported by an intermittently traveling endless conveyor having an upper run for transporting the bowls in an upright position and a lower run for transporting the bowls in an inverted position. A belt which travels intermittently in synchrony with the conveyor is positioned to contact and cover the open tops of the bowls for retaining contents of the bowls therein as the bowls are transported from an upright position on the upper run to an inverted position on the lower run. The belt is retracted at a position beneath the lower run when the conveyor is stationary to release the contents from the bowls.

12 Claims, 8 Drawing Sheets

SYSTEM FOR TRANSFERRING ARTICLES

BACKGROUND OF THE INVENTION

The present invention relates to an emptying system more particularly to an automatic mechanised system of emptying and transferring a product from emptying bowls to a receiving means.

In food factories and in many production lines where products are packed in pouch machines the emptying of bowls containing the product travelling from the feed conveyor to the pouch machine is carried out manually. Such an operation is very tedious and causes many back and neck problems to the personnel owing to the repetitive turning and leaning movements required.

SUMMARY OF THE INVENTION

The present invention provides automatic apparatus and process systems for emptying and transferring non-liquid ingredients from emptying bowls to a receiving means.

Emptying bowls are transported by an intermittently traveling endless conveyor having an upper run for transporting the bowls in an upright position and lower run for transporting the bowls in an inverted position. A belt which travels intermittently in synchrony with te conveyor is positioned to contact and cover the open tops of the bowls transported from an upright position on the upper unto and in an inverted position on the lower run for retaining contents of the bowls therein. The belt is retracted at a position beneath the lower run when the conveyor is stationary to release the contents from the bowls.

DETAILED DESCRIPTION OF THE INVENTION

Included in the present invention is an apparatus which comprises;

a) an endless conveyor belt adapted to travel intermittently for carrying the filled emptying bowls from an upright position on the upper run to an inverted position on the lower run, b) means for feeding filled emptying bowls to the upper run of the endless conveyor belt, c) means for removing empty emptying bowls from the endless conveyor belt, d) means for feeding the receiving means beneath the inverted emptying bowls on the lower run of the endless conveyor belt, and e) a retractable conveyor belt adapted to travel intermittently in synchrony with the endless conveyor belt and to contact and cover the open ends of the filled emptying bowls as they travel from the upper run to the lower run of the endless conveyor belt, the lower downstream end of the retractable conveyor belt being adapted to retract when the endless conveyor belt is stationary and the downstream inverted filled emptying bowl is positioned above a receiving means, to uncover the downstream inverted filled emptying bowl enabling the contents to be transferred to the receiving means.

The process of the present invention includes:

a) feeding filled emptying bowls in an upright position to the upper run of an intermittently running endless conveyor belt, b) advancing the endless conveyor belt to enable the filled emptying bowls to travel from the upper run to the lower run until the downstream filled emptying bowl is in an inverted position, c) feeding a receiving means beneath the inverted emptying bowls on the lower run of the endless conveyor belt, and d) contacting and covering the open ends of the filled emptying bowls with a belt traveling intermittently in synchrony with the endless conveyor belt, whose lower downstream end retracts when the endless conveyor belt is stationary to uncover the downstream inverted filled emptying bowl enabling the contents to be transferred to the receiving means.

The receiving means may simply be a conveyor belt or it may be any kind of receptacle such as a tray or a container having any suitable shape e.g. circular, square or rectangular. Advantageously, the shape of the container may match the shape of the emptying bowl. The container may, for instance, be a pouch.

The endless conveyor belt is advantageously a chain conveyor belt fitted with means for securing the emptying bowls to the belt, e.g. carriers welded to the chain. The endless conveyor belt is conveniently trained around a chain wheel at each end.

The means for feeding filled emptying bowls to the upper run of the endless conveyor belt is conveniently a pusher positioned on a conveyor belt travelling laterally towards the upper run, which pusher is activated when the endless conveyor belt is stationary. The means for removing empty emptying bowls from the endless conveyor belt is advantageously also a pusher positioned on a conveyor belt travelling laterally away from the upper run which pusher is also activated when the endless conveyor belt is stationary. The belts travelling laterally towards and away from the upper run of the endless conveyor belt conveniently are part of a conveyor dosing and weighing system for the bowls.

The retractable conveyor belt prevents the ingredients from falling out of the emptying bowls as they travel from the upper run to the lower run of the endless conveyor belt and thus become inverted. Means are provided to take up the slack when the lower downstream end of the retractable conveyor retracts in order to ensure that it remains in contact with the emptying bowls that it covers e.g. a pneumatic cylinder acting on one of the rollers around which the retracting conveyor is trained, a spring or a counterweight.

Advantageously, a vibratory unit lies adjacent the base of an inverted emptying bowl positioned above a receiving means adapted to act on the base to ensure that substantially all the ingredients fall out of the emptying bowl.

When the receiving means comprises receptacles such as trays or containers preferably, between the lower downstream end of the retracting conveyor and a receptacle there is located a depositing screen to prevent ingredients falling from the emptying bowl onto the sealing surface of the receptacle.

When the receiving means comprises receptacles, the receptacles conveniently travel intermittently beneath the bowl emptying system on a conveyor belt. There may be various receptacle arrangements, for instance, they may be arranged in two rows. When the receptacles are pouches, they are conveniently contained in a conventional pouch machine.

The bowl emptying system may be driven by conventional means, for example, by an electrical step motor or a pneumatic cylinder providing intermittent motion so that when the endless conveyor belt is stationary, filled emptying bowls are fed onto the upper run, empty emptying bowls are removed, the retracting conveyor belt retracts and the contents of the downstream filled inverted emptying bowl are transferred to the receiving means. When the receiving means comprises receptacles, the system may be automated with the receptacles whereby the conveyor belt transporting the receptacles travels intermittently and stops so that a receptacle is at position below and in alignment with a downstream emptying bowl to enable the contents of an emptying bowl to fall into a receptacle.

Ingredients that may be handled include rice, meat chunks, diced meat, sliced meat, shrimps, potatoes sausages, meat balls, vegetables and vegetable mix.

The present invention is illustrated by way of example only with reference to the accompanying drawings.

DETAILED DESCRIPTION OF THE DRAWINGS

Figure 1:
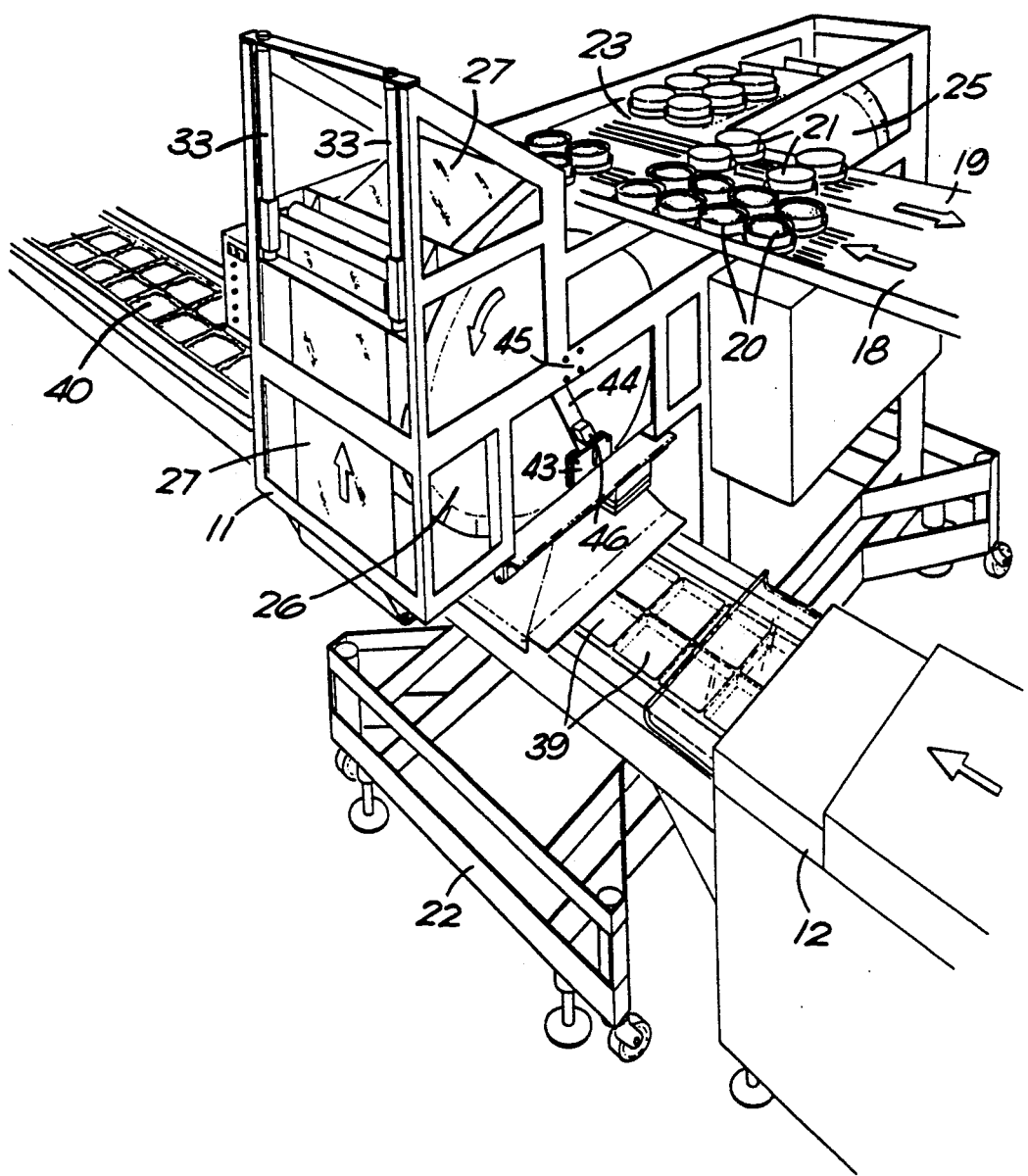
FIG. 1 is a perspective view of a line including the system.
Figure 2:
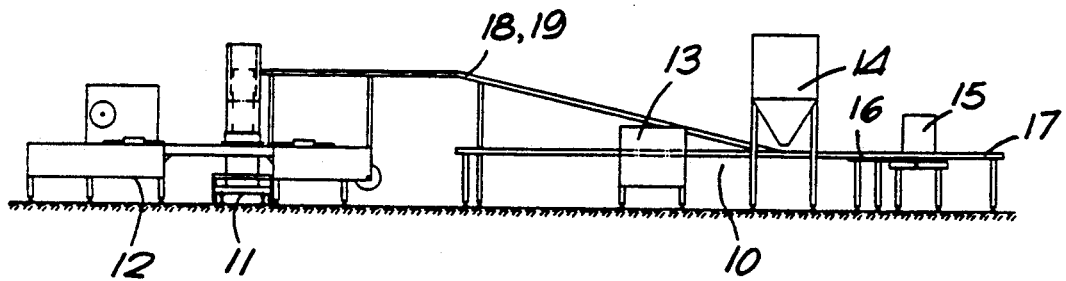
FIG. 2 is a side plan view of the same line.
Figure 3:
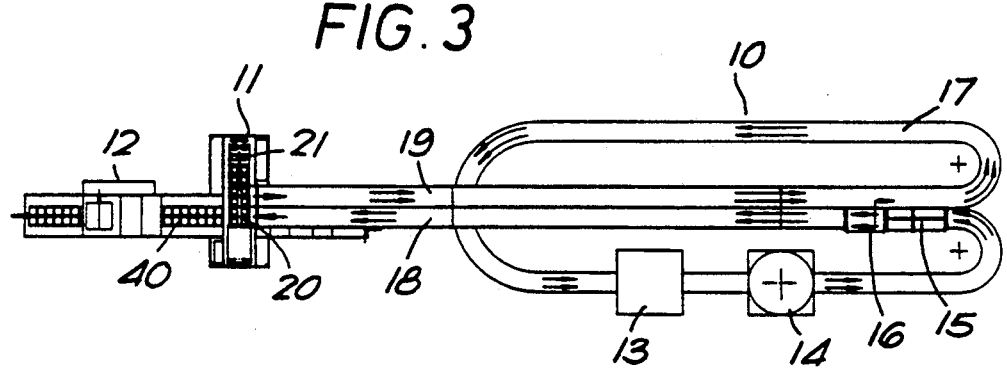
FIG. 3 is a top plan view of the same line.
Figure 10:
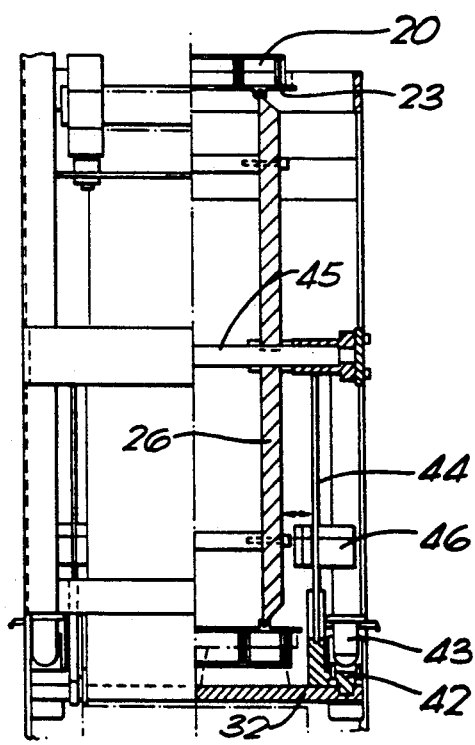
FIG. 10 is an enlarged view of part of FIG. 5.

Referring to the drawings, the line including a system of the present invention, as illustrated in FIGS. 1-3, comprises a bowl filling and conveying unit 10, a bowl emptying unit 11 and a pouch machine 12. The bowl filling unit comprises a dosing unit 13, a multi-head weigher 14, a check weigher 15, a flow divider 16 and a continuously travelling conveyor belt 17 having one run 18 travelling towards and one run 19 travelling away from the bowl emptying unit 11. Filled bowls 20 and emptied bowls 21 are shown in FIG. 1 travelling towards and away from the bowl emptying unit 11 on conveyor belt runs 18 and 19 respectively.

Figure 4:
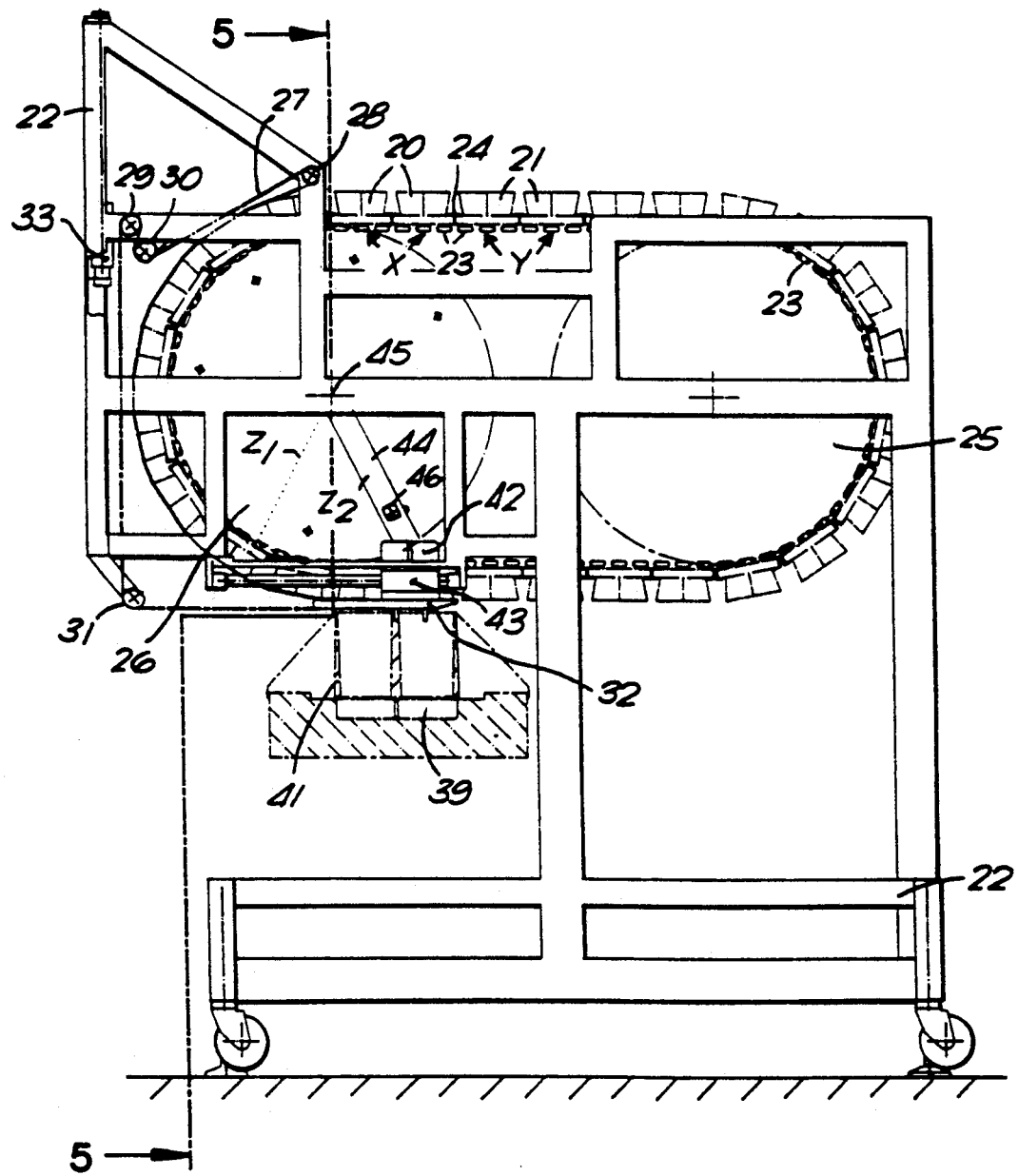
FIG. 4 is a diagrammatic transverse sectional view of the bowl emptying unit.
Figure 5:
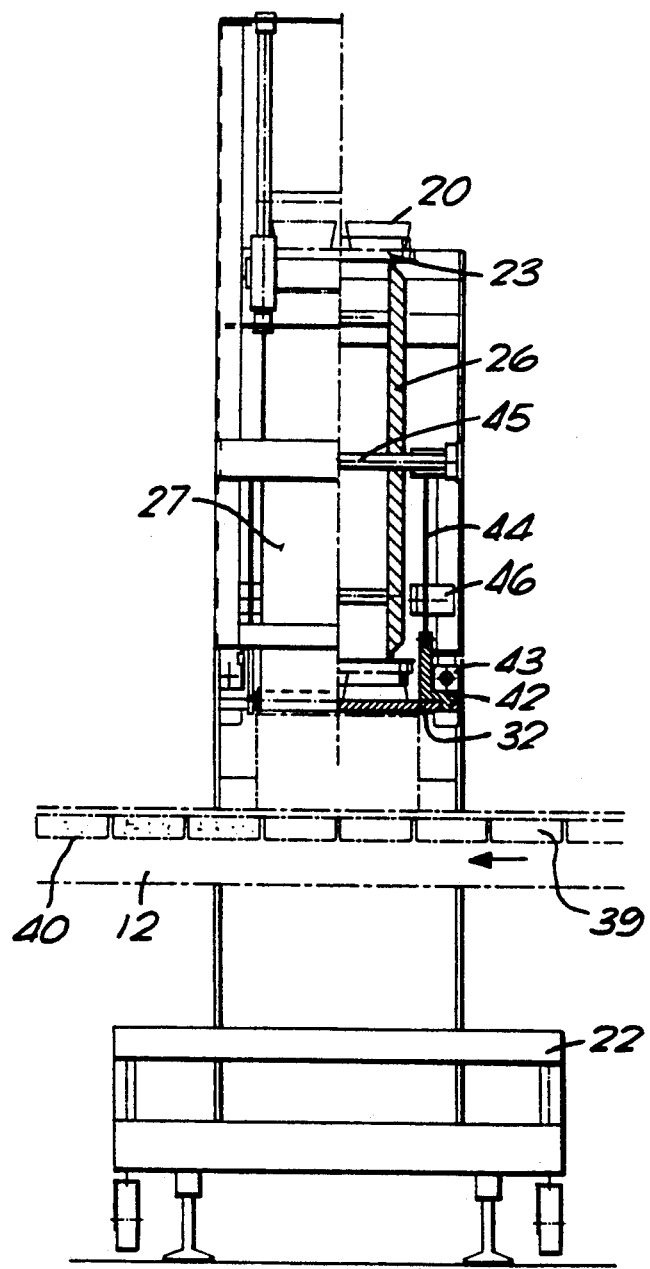
FIG. 5 is a sectional view of a half of the bowl emptying unit looking in the direction 5—5 of FIG. 4.

As illustrated in FIG. 4, the bowl emptying unit comprises a support frame 22 supporting an intermittently travelling chain conveyor 23 carrying bowls 20, 21 by means of carriers 24 welded to the chain trained around chain wheels 25, 26.

A retracting belt 27 is trained around rollers 28, 29, 30, 31 and a reciprocable solid plastics shuttle board 32. Two vertically reciprocating pneumatic cylinders 33 act on roller 29 to take up the slack of belt 27 when the part of it trained around the shuttle board 32 retracts. Alternative methods of taking up the slack are by means of a spring 47 or a counterweight 48 (FIGS. 11-14).

Figure 6:
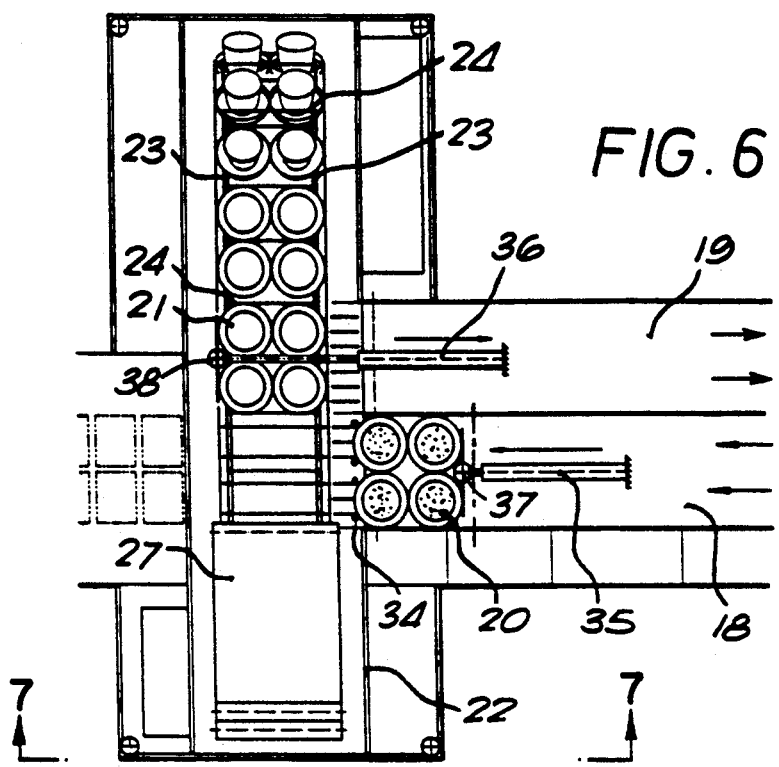
FIG. 6 is a top plan view of a bowl emptying unit.
Figure 7:
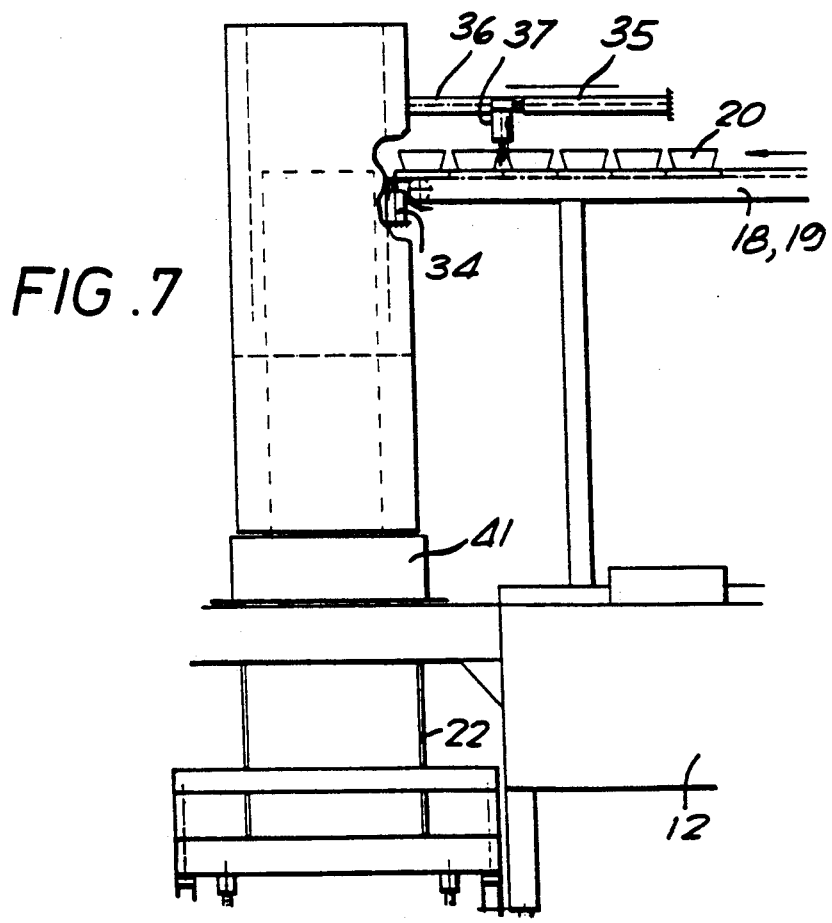
FIG. 7 is a side view of FIG. 6 looking in the direction 7—7.

As illustrated in FIGS. 6 and 7, at the infeed end and beneath the run 18 of conveyor belt 17 is a vertically reciprocable stop 34 for the filled emptying bowls 20. Positioned above runs 18 and 19 are pushers 35 and 36 with vertically reciprocable cylinders 37 and 38 respectively.

The pouch machine 12 (MULTIVAC or Mahaffy Harder) feeds two rows of empty pouches 39 to pass beneath the bowl emptying unit 11 and transports filled pouches 40 away. Positioned between the shuttle board 32 and the empty pouches 39 are depositing screens 41 to prevent the contents of the emptying bowl 20 from landing on the sealing surfaces of the pouches. A vibrating unit (not shown) acts on the base of the emptying bowls 20 to ensure that the contents are emptied out. The shuttle board 32 is fixed by means of two blocks 42 to a driving unit comprising two horizontally located pneumatic cylinders 43 working in parallel to reciprocate the shuttle board 32 and connected by means of two turning arms 44 to the axle 45 of the chain wheel 26. Each turning arm is provided with a reciprocable meshing cylinder 46.

In operation, empty bowls 21 are filled with rice at the dosing unit 13 of the bowl filling and conveying unit 10 and travel along the conveyor belt 17 in the direction of the arrows to a multi-head weigher 14, a check weigher 15 and a flow divider 16 to form two rows of filled bowls 20 which travel towards the intermittently travelling chain conveyor 23 of the bowl emptying unit 11 where they are prevented from passing onto the chain conveyor 23 when it is in motion by means of the reciprocating stop 34 in its upper position.

When the chain conveyor 23 is stationary, the stop 34 and the cylinder 37 of pusher 35 descend and two rows of two bowls are pushed onto chain conveyor 23 at position X (FIG. 4) by means of a pusher 35 moving to the left, as shown by the arrow in FIGS. 6 and 7. Immediately afterwards, chain conveyor 23 advances, stop 34 and cylinder 37 ascend and pusher 35 returns to the position shown in FIGS. 6 and 7. At the same time, as the filled bowls are pushed onto the chain conveyor 23, two rows of two empty bowls 21 are pushed off the chain conveyor 23 by means of a pusher 36 at position Y onto the conveyor belt 19 where they travel in the direction of the arrows to the dosing unit 13.

The chain conveyor 23 advances when the pneumatic cylinders 43 drive the turning arm 44 (FIGS. 8 and 9) by means of the cylinder 46 on the turning arm 44 meshing with chain wheel 26 at position $Z_1$, and the turning arm 44 travels to position $Z_2$, and then stops at which point the reciprocating cylinder 46 unmeshes from the chain wheel and the turning arm travels back to position $Z_1$ where the cycle recommences.

The filled bowls 20 are held in position on the chain conveyor 23 by the carriers 24 and as they travel around the chain wheel 26 to an inverted position on the lower run of the chain conveyor 23, their open tops are covered by the belt 27 travelling at the same peripheral speed as the open tops of the bowls 20 which prevents the ingredients from falling out. When two rows of two filled bowls 20 reach a position directly above two rows of two empty pouches 39 transported intermittently in the pouch machine, the belt 27 and the chain conveyor 23 stop with the turning arm 44 at position $Z_2$ and the cylinder 46 unmeshes from the chain wheel 26 whereupon the pneumatic cylinders 43 move to the left (FIG. 4) causing the turning arm 44 to return to position $Z_1$ and the shuttle board 32 to move to its retracted position (FIG. 9) carrying with it that part of the retracting belt 27 trained around it, thus uncovering the filled bowls 20 whose contents fall out helped by the vibrating unit 37 into the pouches 39 which are stationary. The depositing masks 41 prevent any rice from falling onto the sealing surfaces of the pouches.

As the shuttle board 32 moves to the retracted position, the slack in the retracting belt 27, which is also stationary at this time, is taken up by the action of the pneumatic cylinders 33 which ascend and cause roller 29 to ascend also. This ensures that remaining filled bowls positioned around the chain wheel 26 on the chain conveyor 23 are covered by the retracting belt 27 and the contents do not fall out. At this time also, further filled bowls 20 are pushed onto the chain conveyor and further empty bowls 21 are pushed off the chain conveyor.

Figure 14:
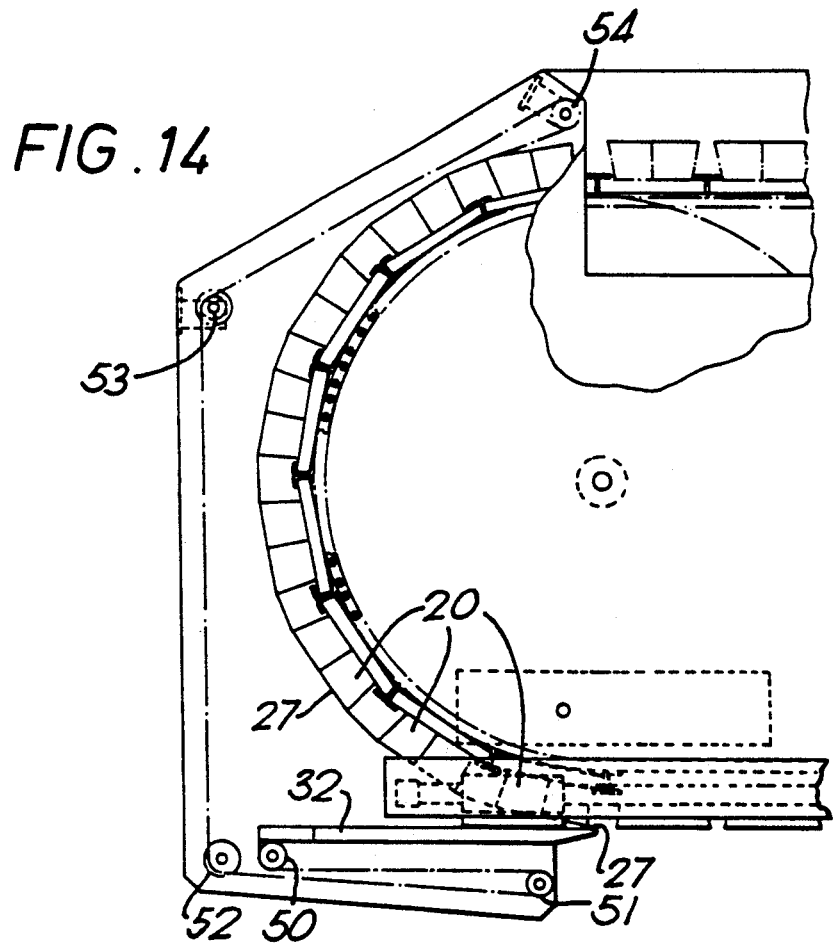

Alternative methods of taking up the slack in the retracting conveyor belt 27 are by means of an extension spring 47 causing roller 29 to ascend (FIG. 12), by means of a counterweight 48 causing roller 29 to descend in which case a further roller 49 is provided (FIG. 13) and by means of a roller 50 attached to and moving together with the shuttle board 32 together with stationary rollers 51, 52, 53 and 54 (FIG. 14).

Figure 8:
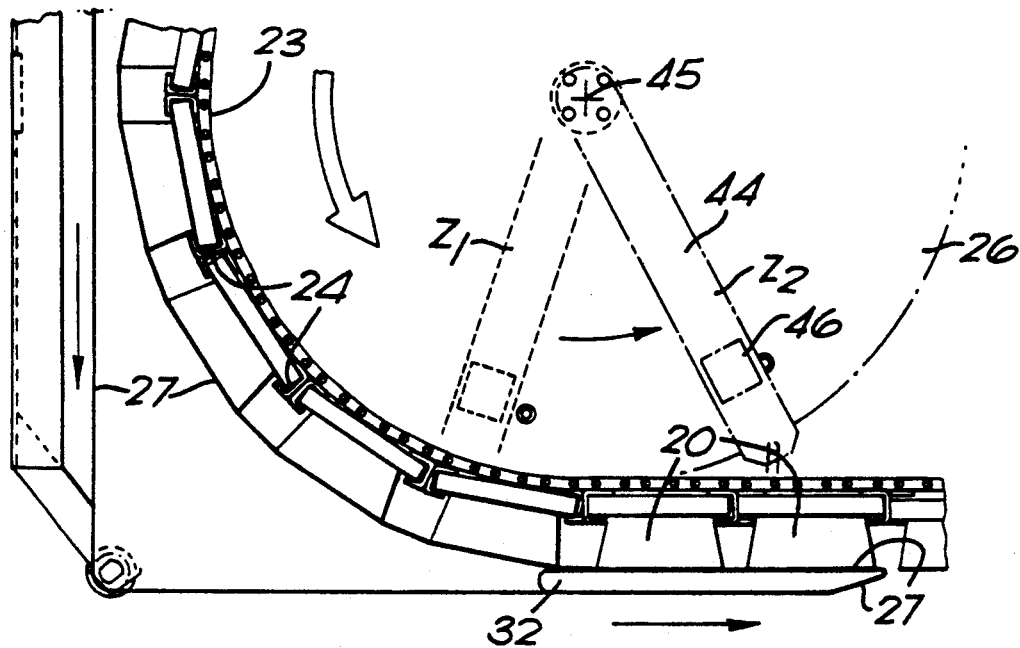
FIG. 8 is an enlarged view of part of the bowl emptying unit of FIG. 4 showing the shuttle board in the forward position.
Figure 9:
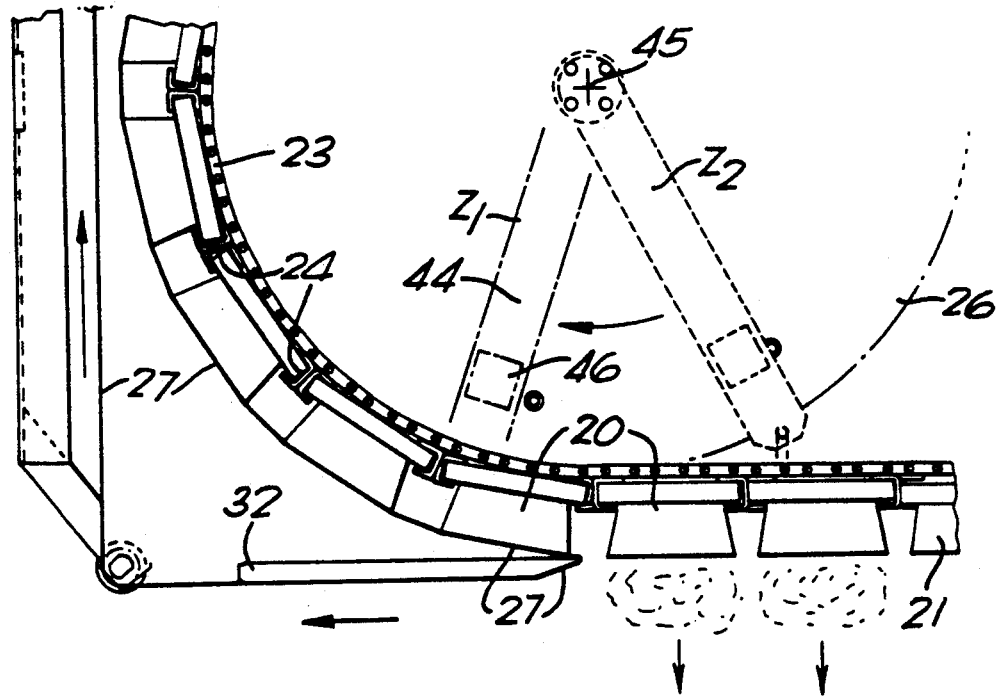
FIG. 9 is an enlarged view of the same part of the bowl emptying unit as shown in FIG. 8 showing the shuttle board in its retracted position.
Figure 11:
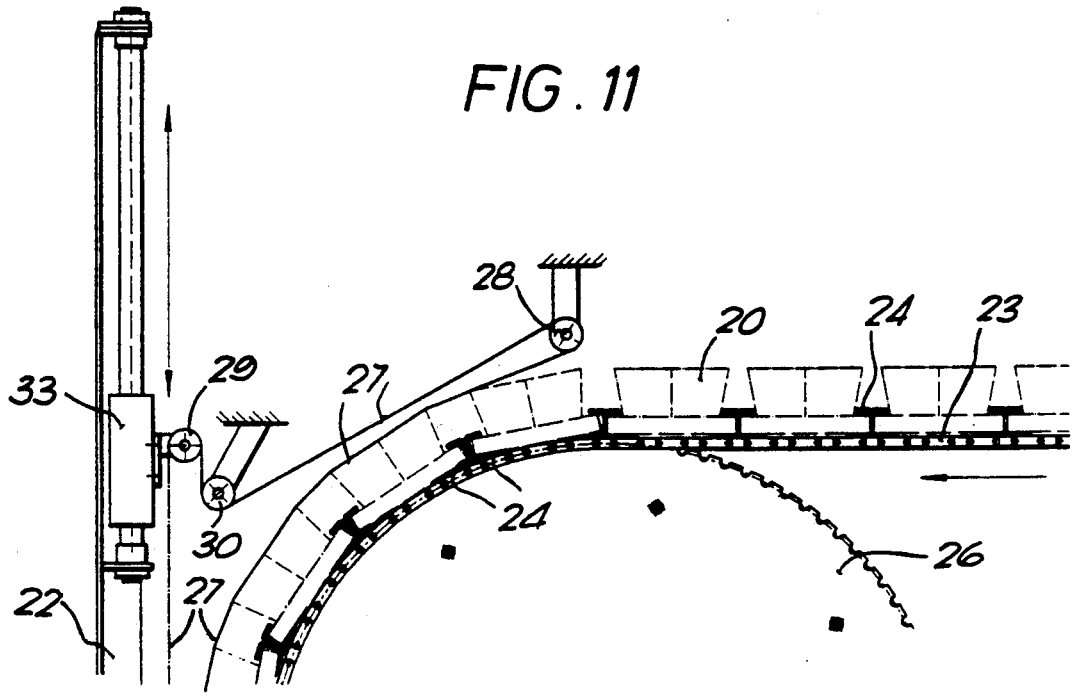
FIGS. 11, 12, 13 and 14 are diagrammatic transverse sectional views of part of the bowl emptying unit showing different methods of taking up the slack of the retracting conveyor belt.
Figure 12:
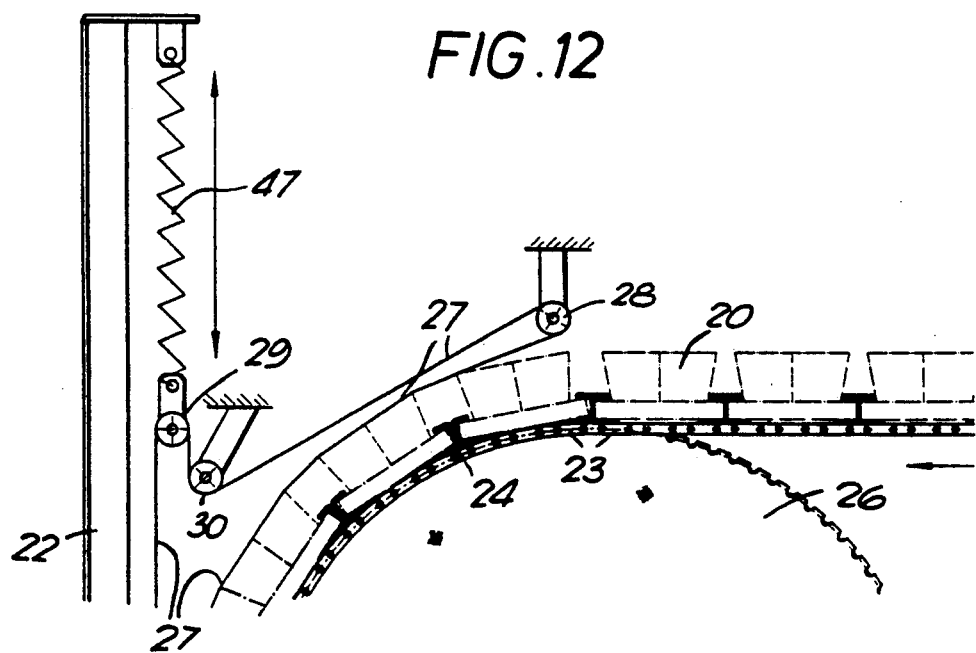
Figure 13:
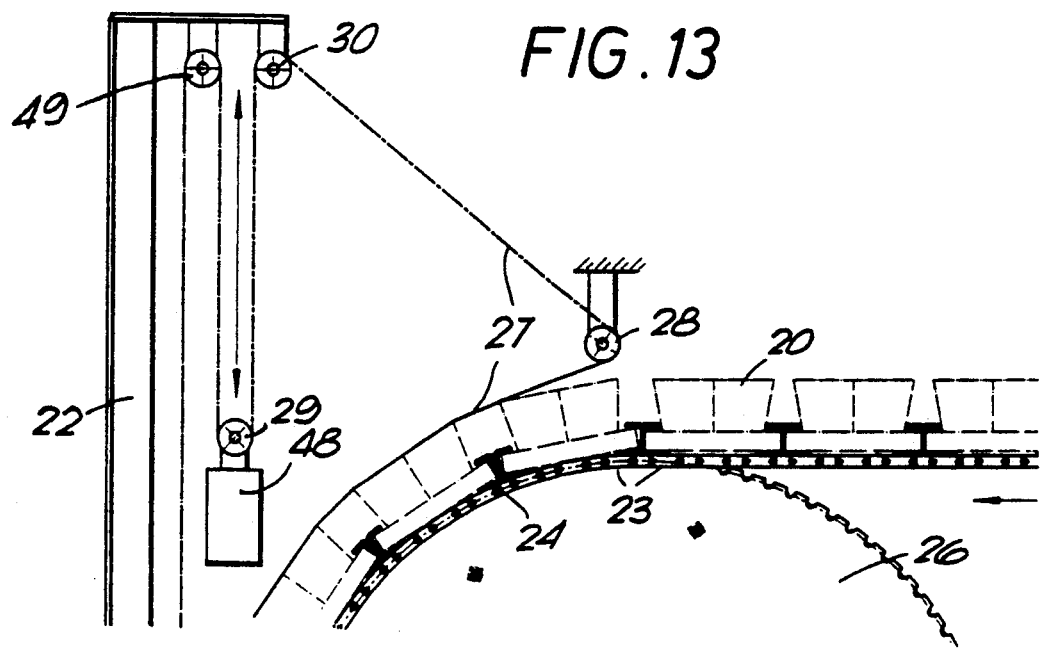

The cylinder 46 then meshes with chain wheel 26, and the pneumatic cylinders 43 move to the right as in FIG. 4, causing the shuttle board 32 to move to the right, as shown in FIG. 8 carrying with it belt 27 as well as causing the turning arm 44 to travel to position $Z_2$ which in turn causes the chain conveyor to advance a sufficient distance for a further batch of two rows of two filled bowls 20 to reach a position above a further batch of two rows of two pouches 39 which have advanced on the pouch machine. The cycle is then repeated and can work at a speed of 60 cycles per minute which means that, with a pouch arrangement of two rows of two, a capacity of 240 pouches per minute can be filled.

Different ingredients can be handled at the same time for dual products, e.g., rice in one pouch and meat in the other.

The bowl emptying unit 11 is attached to and connected with the pouch machine 12, but can easily be disconnected for making hygienic. A continuous cleaning device may, if desired, be added beneath the bowl emptying unit for cleaning the bowls.

I claim:

1. An article transfer apparatus comprising:
    an endless conveyor having an upper run for transporting emptying bowls having an open top in an upright position and a lower run for transporting the bowls in an inverted position;
    means for intermittently advancing the endless conveyor;
    a belt positioned to cover open tops of the bowls transported from an upright position on the upper conveyor run to and in an inverted position on the lower conveyor run for retaining contents of the bowls therein;
    means for intermittently advancing the belt in synchrony with the endless conveyor;
    means for retracting the belt from the bowls at a position on the lower conveyor run to uncover an inverted bowl to release the contents from the bowl; and
    means positioned for receiving the contents released from the uncovered bowls.

2. An apparatus according to claim 1 further comprising means for feeding the bowls to the upper conveyor run for being transported by the endless conveyor and means for removing empty bowls from the upper conveyor run.

3. An apparatus according to claim 2 wherein the means for feeding and the means for removing the bowls to and from the conveyor are pushing devices positioned on conveyors having a run positioned lateral to the endless conveyor runs at a position above the endless conveyor upper run.

4. An apparatus according to claim 1 wherein the means for retracting the belt includes means to take up slack in the belt as the belt retracts.

5. An apparatus according to claim 1 wherein the means for taking up the slack comprise at least one roller about which the belt is trained and means for moving the at least one roller to take up the slack.

6. An apparatus according to claim 1 wherein the means for retracting the belt includes a reciprocal shuttle board.

7. An apparatus according to claim 1 further comprising a vibratory unit positioned for vibrating bowls uncovered by the belt for assisting releasing contents from the bowls.

8. An apparatus according to claim 1 wherein the endless conveyor is a chain conveyor having means to secure the bowls.

9. An apparatus according to claim 1 wherein the bowl is a container having a shape selected from the group consisting of circular, square and rectangular shapes.

10. A process for transferring non-liquid articles comprising:
    intermittently transporting emptying bowls, which have an open top and which have contents contained therein, on an endless conveyor so that the bowls are transported on an upper run of the conveyor in an upright position and on a lower run of the conveyor in an inverted position;
    intermittently advancing a belt in synchrony with the conveyor and bowls to contact and to cover the open tops of the bowls transported from an upright position on the upper conveyor run to and in an inverted position on the lower conveyor run for retaining the contents in the bowls therein;
    feeding a receiving means to a position beneath the lower conveyor run and belt; and
    retracting the belt at a position above the receiving means at a time when the endless conveyor is stationary to uncover inverted bowls to release the contents from the bowls into the receiving means.

11. A process according to claim 10 further comprising vibrating the bowls uncovered to assist releasing the contents from the bowls.

12. A process according to claim 10 further comprising feeding the bowls to and removing the bowls from the upper conveyor run.

* * * * *